No. 623,119. Patented Apr. 11, 1899.
J. CLOOS.
SWITCHING APPARATUS.
(Application filed Feb. 7, 1898.)

(No Model.) 2 Sheets—Sheet 1.

Witnesses:
L. W. C. Danner
George L. Cragg

Inventor,
Jacob Cloos,
By Barton & Brown
Attorneys.

No. 623,119. Patented Apr. 11, 1899.
J. CLOOS.
SWITCHING APPARATUS.
(Application filed Feb. 7, 1898.)

(No Model.) 2 Sheets—Sheet 2.

Witnesses:
A. W. C. Danner.
George L. Cragg.

Inventor,
Jacob Cloos,
By Barton + Brown
Attorneys.

UNITED STATES PATENT OFFICE.

JACOB CLOOS, OF MILWAUKEE, WISCONSIN, ASSIGNOR TO THE CLOOS ELECTRICAL ENGINEERING COMPANY, OF SAME PLACE.

SWITCHING APPARATUS.

SPECIFICATION forming part of Letters Patent No. 623,119, dated April 11, 1899.

Application filed February 7, 1898. Serial No. 669,295. (No model.)

*To all whom it may concern:*

Be it known that I, JACOB CLOOS, a citizen of the United States, residing at Milwaukee, in the county of Milwaukee and State of Wisconsin, have invented a certain new and useful Improvement in Switching Apparatus, (Case No. 3,) of which the following is a full, clear, concise, and exact description.

My invention relates to switching apparatus for controlling the distribution of electricity, and particularly to that class of switching apparatus whereby loop-circuits containing translating devices are associated with and dissociated from feeders extending from generators of current.

My invention has for its object the improvement in switching mechanism of this class whereby certain objectionable features, especially in the distribution of currents of high potential, are overcome—such, for example, as the interruption of the circuit, including the generator, upon connecting or disconnecting the loop-circuit.

Generally speaking, an apparatus constructed in accordance with my invention may be described as consisting of switch parts and circuit-changing portions for including the mains of the loop-circuit in series with the feeders and removing the mains from circuit with the feeders, the switching apparatus being so constructed that when properly manipulated the circuit through the feeders is never broken.

The apparatus of the preferred embodiment of the invention may be generally described as consisting of terminals for the feeders and loop-circuit, a conducting portion, means for connecting the conducting portion with all of said terminals at the same time, switch parts for connecting the feeder-terminals with the loop-terminals in series, the whole apparatus being constructed to permit of the connection of the loop-terminals with and disconnection of said terminals from the feeder-terminals while said portion is serving to connect the feeder-terminals. The switch parts are preferably disposed in a box containing oil, preferably kerosene, whereby sparking at the contact parts is counteracted.

In order that my invention may be more fully understood, I will particularly explain the same by reference to the accompanying drawings, illustrating the preferred embodiment thereof.

Figure 1:
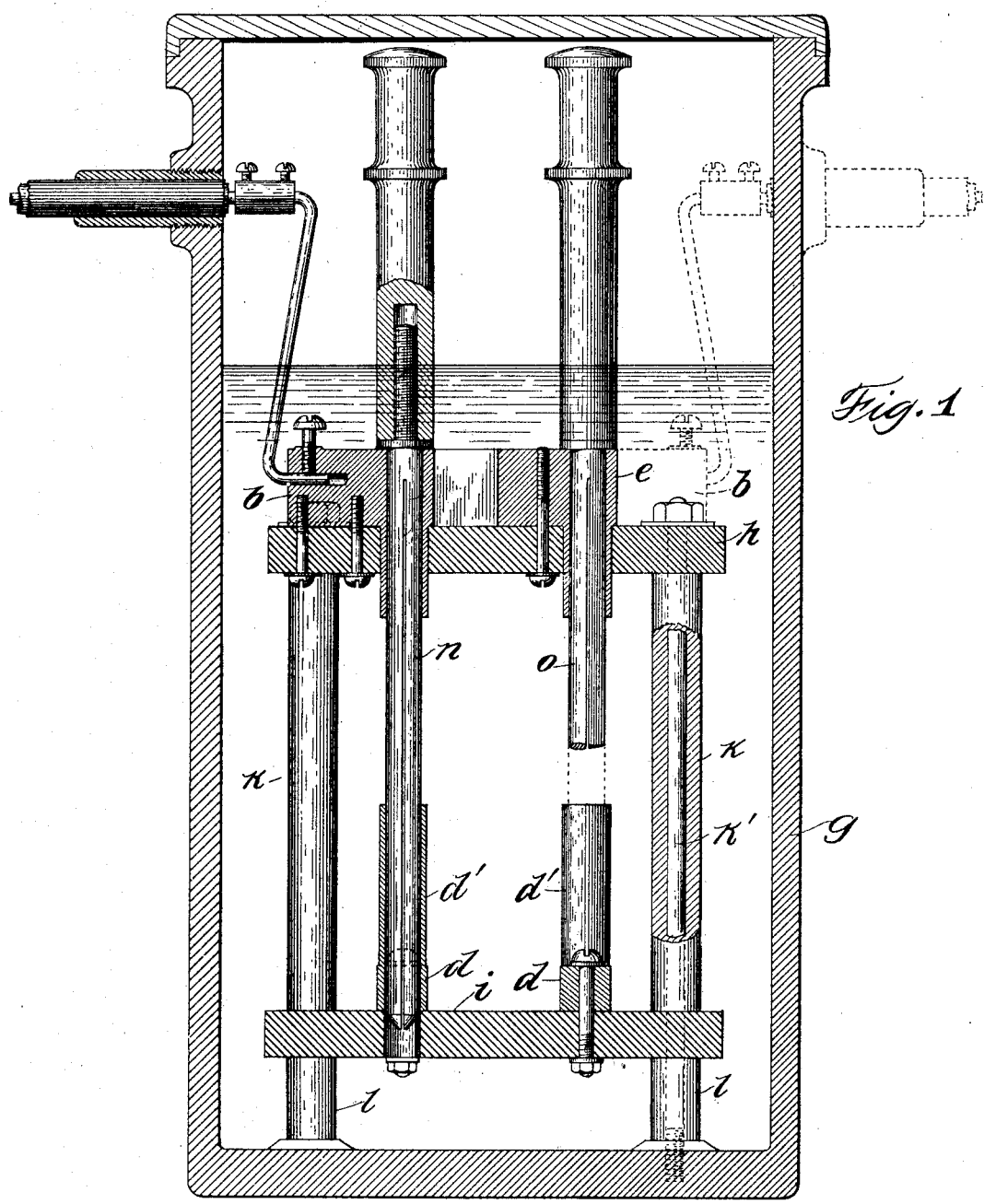
Figure 2:
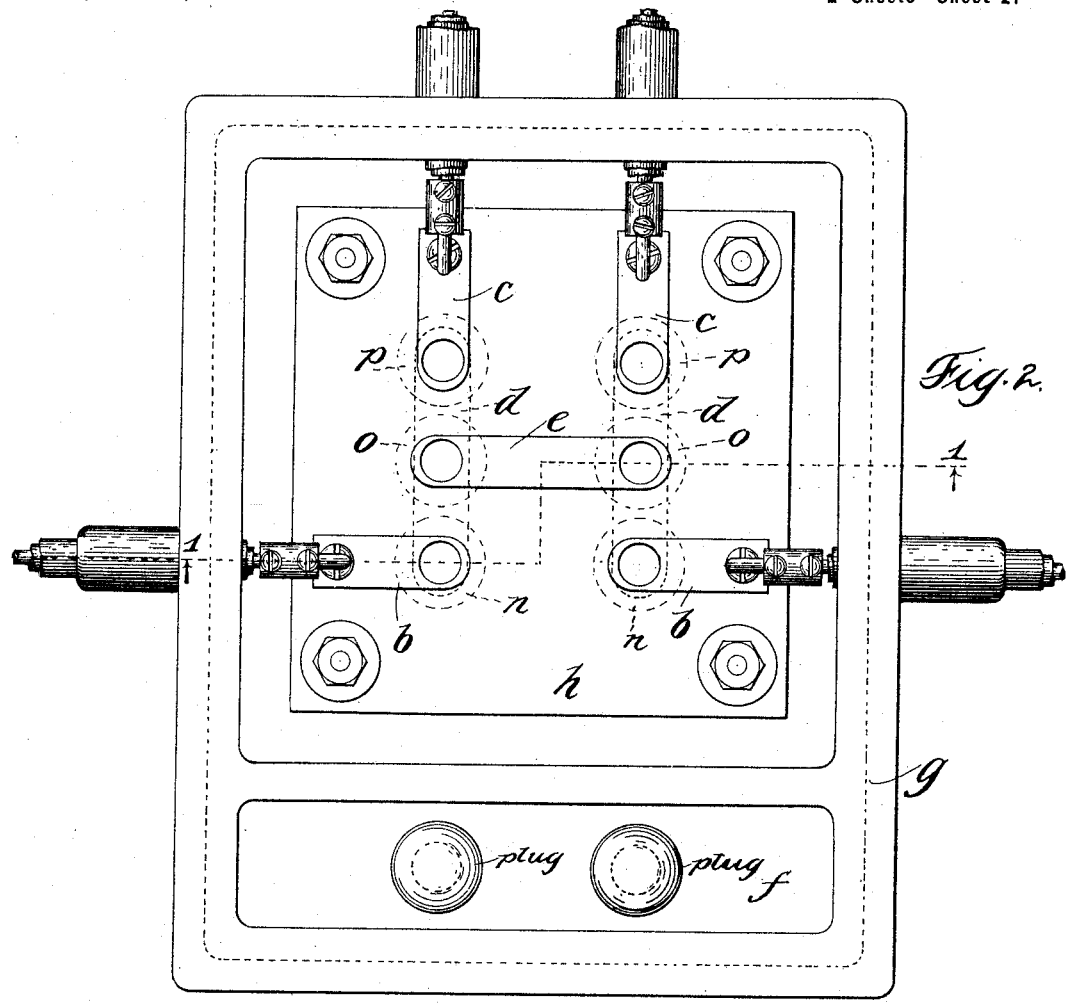
Figure 3:
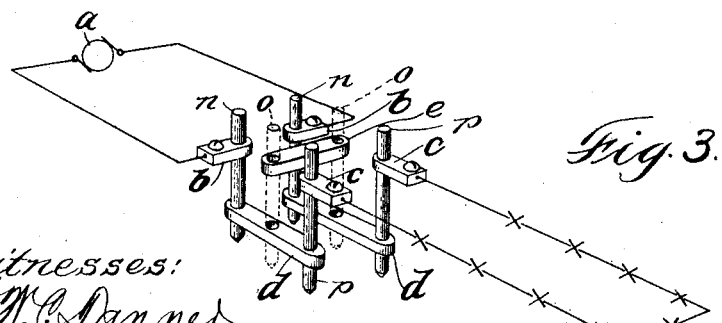

In the drawings, Figure 1 is a sectional elevation of a junction-box and switching apparatus constructed in accordance with the invention on line 1 1 of Fig. 2. Fig. 2 is a plan view thereof with the cover of the junction-box removed. Fig. 3 is a diagrammatic view showing the circuit connections.

Like parts are indicated by like letters throughout the different views.

In the form of the invention illustrated the feeders, leading from a suitable generator $a$, terminate in contact-terminals $b\ b$. The mains terminate in contact-terminals $c\ c$. Contact-plates $d\ d$, arranged preferably beneath the contact-plates $b\ b\ c\ c$, are provided with apertures or sockets at their ends which register, respectively, with sockets in the plates or terminals above the same. A third plate $e$ is provided above the plates $d\ d$, the ends of said plates being provided with sockets adapted to register with sockets in the intermediate portions of the plates $d\ d$.

I preferably employ six plugs, four of which are constantly in service, the remaining plugs, normally out of service, being supported by a shelf $f$, formed upon the interior of the box $g$.

The terminals $b\ b$ and $c\ c$ and the plate $e$ are mounted upon an insulating-base $h$. The plates $d\ d$ are mounted upon an insulating-base $i$. Distance-pieces $k\ k$ are interposed between the bases and serve to maintain the proper alinement of the contact parts. Additional distance-pieces $l$ are provided for supporting the base $i$ and for insulating the entire structure from the surrounding box $g$, made, preferably, of iron.

The sockets of the lower contact portions are preferably provided with elongations $d'\ d'$, extending upwardly. The sockets of the upper contact portions are provided with similar extensions, which are directed downward. Bolts $k'$ are preferably passed through the distance-pieces $k$ and $l$ into the bottom of the junction-box $g$ for rigidly uniting all of the fixed parts of the apparatus. The conducting portions of the plugs are preferably slotted, as shown in Fig. 1, to maintain a firm engagement between the same and the sockets. The feeder and main conductors are led into the interior of the box and united with their respective terminals, preferably by screws.

In manipulating the apparatus we will first assume that the loop-circuit is idle. In this condition of the system the plugs $n\ n$ and $o\ o$ are in position to connect the sockets $b\ b$ and plate $e$ with the plates $d\ d$, as shown in Fig. 3. To connect the conducting-mains in series with the feeders, the plugs $p\ p$ are manipulated to connect the sockets $c\ c$ with the plates $d\ d$. Upon withdrawing either or both of the plugs $o\ o$ the mains will be included in series with the feeders, whereupon the translating devices in the loop-circuit may be supplied with current. In order to remove the loop-circuit, the contact plate or portion $e$ is first connected with both plates $d\ d$ by plugs, whereupon the plugs $p\ p$ are withdrawn to open the loop-circuit, the circuit through the feeders being thus uninterrupted. The portions $e$ and $d\ d$ might be of other construction to secure the electrical connection between the sockets thereof.

While I have herein shown and particularly described the preferred embodiment of my invention, it is obvious that modifications of the apparatus shown may be readily made by those skilled in the art without departing from the spirit of the invention.

Having, however, fully described my embodiment of the invention, I claim as new, and desire to secure by these Letters Patent, the following:

1. In a switch for controlling the series distribution of electricity, the combination with feeder-terminal sockets $b\ b$, of loop-circuit-terminal sockets $c\ c$, a socketed contact portion $e$, socketed contact portions $d\ d$, the sockets whereof are placed in alinement with the sockets in the portions $b\ b$, $c\ c$ and $e$, and plugs adapted for insertion within the alined sockets, said plates $d\ d$ being each adapted through the medium of the connecting-plugs to connect one feeder-terminal with one loop-circuit terminal to include the loop-circuit in series with the feeders, the portion $e$ being adapted for connection with the plates $d\ d$ and thereby with all of the feeder and loop-circuit terminals through the medium of plugs, substantially as described.

2. In a switch for controlling the series distribution of electricity, the combination with feeder-terminal sockets $b\ b$, of loop-circuit-terminal sockets $c\ c$, a socketed contact portion $e$, socketed contact portions $d\ d$, the sockets whereof are placed in alinement with the sockets in the portions $b\ b$, $c\ c$ and $e$, plugs adapted for insertion within the alined sockets, said plates $d\ d$ being each adapted, through the medium of the connecting-plugs to connect one feeder-terminal with one loop-circuit terminal to include the loop-circuit in series with the feeders, the portion $e$ being adapted for connection with the plates $d\ d$ and thereby with all of the feeder and loop-circuit terminals through the medium of plugs, a box containing the above-described switching mechanism, and oil provided in the box in which said mechanism is immersed, or partially immersed, substantially as described.

3. In a system of distribution, the combination with a generator $a$ connected with feeders, of sockets $b\ b$ forming terminals of the feeders, a loop consumption-circuit, sockets $c\ c$ forming terminals thereof, socketed contact portions $d\ d$, the sockets whereof are placed in alinement with the sockets in contact portions $b\ b$, $c\ c$, means for electrically connecting the contact portions $d\ d$ and plugs for insertion within the alined sockets, said portions $d\ d$ being each adapted through the medium of the connecting-plugs to connect one feeder-terminal with one loop-circuit terminal to include the loop-circuit in series with the feeders, the aforesaid means serving through the medium of said plugs to connect all of the feeder and loop-circuit terminals together, substantially as described.

4. In a system of distribution, the combination with a generator $a$ connected with feeders, of a loop consumption-circuit, sockets $c\ c$ forming terminals of the loop consumption-circuit, socketed contact portions $d\ d$ connected or adapted to be connected with the feeders, means for electrically connecting the contact portions $d\ d$, and plugs for insertion within the sockets of terminals $c\ c$ and portions $d\ d$, said portions $d\ d$ being each adapted, through the medium of the connecting-plugs, to connect one feeder with one loop-circuit terminal to include the loop-circuit in series with the feeders, the aforesaid means serving, through the medium of said plugs, to connect the feeders with the loop-circuit terminals independently of the loop-circuit conductors, substantially as described.

In witness whereof I hereunto subscribe my name this 31st day of January, A. D. 1898.

JACOB CLOOS.

Witnesses:
PAUL D. CARPENTER,
JULIA FAY SEAMANS.